United States Patent [19]

Bargigia et al.

[11] 4,198,313
[45] Apr. 15, 1980

[54] PROPELLANT COMPOSITIONS FOR AEROSOLS

[75] Inventors: Gianangelo Bargigia; Gerardo Caporiccio; Giuliano Carniselli, all of Milan, Italy

[73] Assignee: Montedison S.p.A., Milan, Italy

[21] Appl. No.: 860,084

[22] Filed: Dec. 13, 1977

Related U.S. Application Data

[63] Continuation-in-part of Ser. No. 787,260, Apr. 13, 1977, abandoned.

[30] Foreign Application Priority Data

Apr. 16, 1976 [IT] Italy .............................. 22380 A/76
Feb. 25, 1977 [IT] Italy .............................. 20698 A/77

[51] Int. Cl.² .......................... C09K 3/30; A61L 9/04
[52] U.S. Cl. ..................................... 252/305; 252/10; 252/90; 252/522 R; 424/45; 424/47; 424/76
[58] Field of Search ..................... 252/305; 424/45, 47

[56] References Cited

U.S. PATENT DOCUMENTS

| | | | |
|---|---|---|---|
| 2,321,023 | 6/1943 | Goodhue et al. | 252/305 X |
| 2,524,590 | 10/1950 | Boe | 252/305 |
| 2,653,130 | 9/1953 | Eiseman, Jr. | 252/305 X |
| 3,102,101 | 8/1963 | Hawley et al. | 252/305 X |
| 3,840,465 | 10/1974 | Knowles et al. | 252/90 |

*Primary Examiner*—Richard D. Lovering
*Attorney, Agent, or Firm*—Morgan, Finnegan, Pine, Foley & Lee

[57] ABSTRACT

The present invention concerns new propellant compositions for aerosols. More particularly, the propellant compositions of this invention consist of a mixture of one or more propelling hydrocarbon substances selected from the group consisting of propane, n-butane, isobutane, pentane and isopentanes with one or more halogenated organic compounds selected from the group consisting of $CBrF_3$, $CBrClF_2$ and $CBrF_2-CBrF_2$.

1 Claim, No Drawings

PROPELLANT COMPOSITIONS FOR AEROSOLS

CROSS-REFERENCE TO RELATED APPLICATION

This application is a continuation-in-part of copending application Ser. No. 787,260, filed Apr. 13, 1977, and now abandoned.

BACKGROUND OF THE INVENTION

It is known that hydrocarbon propellants are used in certain formulations for aerosols. The hydrocarbons most commonly used for that purpose are: propane, n-butane and isobutane gases. These gaseous hydrocarbons are used alone as well as in various admixtures with each other or with low-boiling liquid hydrocarbons, in particular, pentane and isopentanes.

For instance, propane, in view of its too high vapor pressure, is commonly used together with other hydrocarbons with a higher boiling point, such as for instance n-butane, pentane and isopentanes. The hydrocarbons with an intermediate boiling point, such as isobutane, on the contrary, may be used alone by themselves.

The hydrocarbon propellants suffer from two serious drawbacks, as far as their use in aerosol compositions is concerned. The first drawback is their high inflammability. The second one consists in their low solvent power. In fact, they are not capable in general to form a homogeneous liquid phase with the other components of the formulations for aerosols, that is, the active principles, the solvents of said active principles and the various auxiliary ingredients habitually used. In certain cases it would be possible to obtain a homogeneous liquid phase containing the active principles if there were added high quantities of solvents, such as, for instance, ethanol or isopropanol; however, the formulations thus obtained would not contain a sufficient quantity of propellant in order to insure a correct and complete delivery of the formulation contained in the spraying bottles. Said formulations would likewise be very inflammable.

The hydrocarbon propellants are thus used almost exclusively in formulations containing an aqueous phase which contains the active principles in an emulsified or suspended state. During the use of the aerosol bombs, the presence of water in the aerosol jet reduces the risk due to the inflammability of the hydrocarbons. In the case of damages to the container, for instance, due to wear or corrosion, the propellant may, however, be delivered into the atmosphere with a consequential danger of explosion and fire. The possibility of such leakages of propellant makes the storing of the aerosol bombs rather unsafe, considering the possibility of an accumulation of hydrocarbon vapor in the storehouses.

OBJECTS OF THE INVENTION

Thus, one object of this invention is that of providing propellant compositions for aerosols containing hydrocarbons that are not inflammable both during use as well as during storage.

Still another object of this invention is that of providing a composition that, although containing hydrocarbons, is endowed with a satisfactory solvent capacity towards the active principles of the formulations for aerosols, towards their corresponding solvents and other ingredients.

GENERAL DESCRIPTION OF THE INVENTION

These and still other objects are achieved by the compositions conforming with this invention and which consist of a mixture of one or more hydrocarbon propellant substances with one or more halogenated organic compounds A, selected from the group consising of $CBrF_3$, $CBrClF_2$ and $CBrF_2—CBrF_2$.

Preferably, the compositions according to this invention contain also a third propelling component, that is, a fluorinated or chlorofluorinated propellant B, such as, for instance:
$CHClF_2$, $CH_2ClF$, $CHF_2—CH_2F$, $CH_3—CF_3$, $CHF_2—CHF_2$, $CH_2F—CF_3$, $CH_3—CHF_2$, $CF_3—CHCl_2$, $CClF_2—CHF_2$, $CF_3—CH_2Cl$, $CHF_2—CHClF$ and $CH_3—CClF_2$.

By the term "hydrocarbon propellant substances," for the purposes of this invention, are intended propane, n-butane and isobutane gases, as well as the low-boiling liquid hydrocarbons, particularly pentane and isopentanes. The hydrocarbon propellants may be used either alone by themselves or in various combinations with each other.

The halogenated organic compounds A, according to this invention, are gases ($CBrF_3$, $CBrClF_2$) or a low-boiling liquid ($CBrF_2—CBrF_2$). They may be used either singly, by themselves, or in various combinations with each other. The preferred compound is $CBrF_3$.

In the case of binary compositions, that is, consisting of one or more hydrocarbon propellants and of one or more halogenated organic compounds A, the quantity of compounds A in the composition (that is, in the mixture of hydrocarbons and compounds A) is in general comprised between 40 and 70% by weight of the total propellant components, and preferably between 50 and 60% by weight. When the quantity of compounds A is less than 40%, in general, one loses the desired main properties: that is, the non-inflammability and the good solvent power. Reference to % herein refers to % by weight of the total propellant components.

Among the preferred binary compositions, as far as non-inflammability and high solvent power are involved, are the following compositions: isobutane, $CBrF_3$; propane, isobutane, $CBrClF_2$; propane, n-butane, $CBrF_3$; propane, $CBrF_2—CBrF_2$; n-butane, $CBrF_3$; propane, isobutane, $CBrF_3$, $CBrClF_2$.

In the case of ternary compositions; besides one or more hydrocarbon propellants and one or more halogenated organic compounds A, one also uses a fluorinated or chlorofluorinated propellant B. Preferably, the ternary compositions contain one or more hydrocarbons, a compound A and a compound B. The most preferred compositions contain, usually, a hydrocarbon, a compound A and a compound B.

The relative ratios between the three types of components of the ternary compositions in general is comprised respectively within the following range of values:

| | |
|---|---|
| hydrocarbon propellants | 5–50% |
| halogenated organic compounds A | 5–40% |
| fluorinated or chlorofluorinated propellants B | 30–90% |

Using quantities of hydrocarbon greater than 50% by weight, the compositions in general lose the desired main properties: that is, the non-inflammability and the good solvent power. However, the maximum tolerance to hydrocarbons, in order to maintain such properties, depends on the nature of compounds A and B, as well as on their ratio to each other, wherefore, in certain instances, the content in hydrocarbons may exceed such a value and rise, e.g., to about 58%.

In the value ranges indicated above, the quantity of compounds A must be so much the higher the higher the quantity of hydrocarbons: thus, if there is used 50% of hydrocarbons, it may be necessary to use (depending on the nature of the compounds A and B) up to 20% of compounds A in order to maintain the desired properties, while, if only 5% of hydrocarbons are used, it will suffice to use 5% of compounds A.

Preferably, the relative ratios between the three types of components is chosen from among the following ranges of values:

| | |
|---|---|
| hydrocarbon propellants | 20–40% |
| halogenated organic compounds A | 10–25% |
| fluorinated or chlorofluorinated compounds B | 40–70% |

In these preferred compositions, when the quantity of hydrocarbons is comprised between 35% and 40%, the ratio between the quantity of hydrocarbons and that of the compounds A in general cannot exceed 2.5.

The preferred compounds B are: $CHClF_2$, $CH_3-CHF_2$, $CF_3-CH_2Cl$, $CH_3-CClF_2$ and $CH_3-CF_3$.

Among these last compounds the most preferred are: $CH_3-CHF_2$, $CF_3-CH_2Cl$ and $CH_3-CClF_2$.

As preferred ternary compositions may be listed: isobutane, $CHClF_2$, $CBrF_3$; n-butane, $CHClF_2$, $CBrF_3$; n-butane, $CHClF_2$, $CBrClF_2$; propane, isobutane, $CHClF_2$, $CBrClF_2$; n-butane, $CH_3-CF_3$, $CBrF_3$; pentanes, $CH_3-CF_3$, $CBrF_3$; isobutane, $CClF_2-CH_3$, $CBrF_3$; isobutane, $CClF_2-CH_3$, $CBrClF_2$; n-butane, $CClF_2-CH_3$, $CBrF_3$; n-butane, $CClF_2-CH_3$, $CBrClF_2$; isobutane, $CHF_2-CHF_2$, $CBrF_3$; n-butane, $CHF_2-CHF_2$, $CBrF_2-CBrF_2$; n-butane, $CHF_2-CHF_2$, $CBrClF_2$; n-butane, $CHF_2-CHF_2$, $CBrF_3$; n-butane, $CH_3-CHF_2$, $CBrF_3$; propane $CH_2ClF$, $CBrF_3$; n-butane, $CF_3-CH_2Cl$, $CBrF_3$; propane, $CF_3-CHCl_2$, $CBrF_3$; isobutane, $CClF_2-CHF_2$, $CBrF_3$; isobutane, $CH_2ClF$, $CBrF_3$; isobutane, $CF_3-CH_2Cl$, $CBrF_3$.

The following ternary compositions are particularly preferred: n-butane, $CHClF_2$, $CBrF_3$; isobutane, $CClF_2-CH_3$, $CBrF_3$; n-butane, $CClF_2-CH_3$; n-butane, $CH_3-CHF_2$, $CBrF_3$; n-butane, $CF_3-CH_2Cl$, $CBrF_3$; n-butane, $CH_3-CF_3$, $CBrF_3$.

The ternary compositions based on $CH_3-CF_3$ and $CBrF_3$ offer the particular advantage that their tolerance towards hydrocarbons, that is, towards the cheaper component, is far higher than that of the majority of the other ternary compositions. In fact, the content in hydrocarbon often exceeds 50%, and in certain cases may reach about 58%.

The inflammability of the compositions according to this invention and of various formulations based on these compositions, has been tested by means of the flame propagation test of the Bureau of Explosives (B.O.E.) of the USA, described on pages 136–140 of the treatise by Paul A. Sanders: "Principles of Aerosol Technology," Van Nostrand Reinhold Company, New York, 1970.

According to such a test, a liquefied compressed gas is said to be inflammable when, ejected from the valve of a typical aerosol container placed 6 inches away from a source of a typical flame (plumber's gas burner), produces a flame that stretches out for more than 18 inches beyond the flame source when the valve of the spray nozzle is fully open.

The compositions according to this invention and the formulations based on it have always proved uninflammable on the basis of the above-defined test.

Also, the solvent power of the compositions has proved high. While, for instance, the hydrocarbon propellants by themselves precipitate the resins usually used in formulations as hair lacquers, for instance, vinyl resins and polyvinylpyrrolidone, from their solutions in suitable solvents (e.g.,: alcohols and esters), the simultaneous presence of the other compounds of this invention in suitable proportions with the hydrocarbons maintains the resins in solution.

The pressure of the compositions according to this invention in general is comprised between about 2.5 and 12 absolute atmospheres at 21° C.

Since they solve the problems that so far had limited the use of the hydrocarbons in aerosol formulations, the compositions, according to this invention, find wide fields of application.

They may be used, among others, in all those applications in which hydrocarbons are already used, as well as in applications in which at present there are used chlorofluorinated propellants. The compositions according to the present invention, among others, may be used in the field of hair lacquers, anti-perspiration products, perfumes, deodorants for rooms, paints, insecticides, home cleaning products, waxes, etc.

The compositions according to the present invention may be used in formulations in a homogeneous phase (that is, containing a single, homogeneous, liquid organic phase), and in formulations in heterogeneous phases (that is, containing a liquid organic phase and an aqueous phase containing the active principles in the state of emulsion or suspension).

The formulations containing the binary and ternary propelling compositions according to the present invention, may, moreover, contain:

Dispersing agents or solvents such as water and various organic solvents: alcohols, glycols, chlorohydrocarbons, esters, ethers, aldehydes and ketones, for instance, ethanol, ethyleneglycol, propyleneglycol, methylene chloride, ethyl ether, ethyl acetate, butyl acetate.

Auxiliary dispersants: ionic and non-ionic type surfactants, such as for instance: triethanolaminolaurylsulphate, polyethyleneglycols, diethyleneglycol monostearate, benzyldodecyldimethylammoniumsulphate, glycerides.

Auxiliaries with a filling action, such as for instance special types of dispersed silica and of talcs.

Auxiliaries modifying the rheological properties such as certain cellulose derivatives and certain synthetic polymer derivatives, for instance, carboxymethylcellulose and polyvinylacetate.

Auxiliaries with a binding action, such as for instance: polyvinylpyrrolidone and vinylacetatecarboxylate copolymer.

Active principles with an anti-septic action, deodorizing, perfuming, pharmacological, pesticide, antipathogenous action, etc. Such active principles may belong to different classes of substances such as for instance: aldehydes, ketones, aliphatic and aromatic alcohols, esters of higher acids, glycerides, terpenic derivatives, polychlorobenzenes, quaternary ammonium salts, carbanylides, phenolic derivatives and thio-derivatives.

The main advantages offered by the compositions which are the object of the present invention may be summarized as follows:

Although containing hydrocarbons, they are not inflammable neither under working conditions nor under storage conditions, and they have a high solvent power;

They may be used in a wide range of applications.

SPECIFIC DESCRIPTION OF THE INVENTION

The following examples are given for illustrative purposes, in order to more clearly describe the inventive idea.

EXAMPLE 1

There was prepared a solution A, suited for an air deodorant (air freshener), consisting of 1.5 parts (by weight) of isopropylmyristate, 60 parts b.w. of pure ethanol and 30 parts b.w. of methylene chloride. 40 g of this solution were then placed into an aerosol container made of Pyrex glass and having a holding capacity of 135 ml.

Onto the container was then fitted a spray valve provided with a dip tube, and then, by means of a calibrated pneumatic metering device, into the container were injected 50 ml of a mixture of isobutane (50% b.w.) and $CBrF_3$ (50% b.w.). The mixture that thus formed in the container appeared perfectly homogeneous, both at room temperature (about 25° C.), as well as at 0° C.

To the spraying valve was then fitted an actuator (valve opening device). In order to vent (degassing) the container by discharging the trapped air, the container was turned upside down, and the actuator was kept pressed for 10 seconds.

In order to carry out the B.O.E. test on flame propagation described previously, a metal straightedge fitted with 1 inch (2.54 cm) notches was arranged horizontally. The spray bomb was then placed upright in correspondence with the first notch of the straightedge, directing the spraying nozzle in such a way that the jet will travel along the straightedge.

In correspondence with the seventh notch, there was placed a plumber's gas burner adjusted and fed in such a way as to deliver a 2 inch long flame that will lap on the metal straightedge.

No. 25 notch of the straightedge will correspond in this way to the 18 inch limit prescribed by the B.O.E. test of flame propagation. As already explained, according to this test, in the case that the propellant coming out of the container lights up, producing a flame that extends beyond the 18 inch limit, the propellant will be considered inflammable. Moreover, it for any degree of pressing-down of the actuator there is a backfiring towards the spray nozzle, the propellant is to be considered highly inflammable.

Five times the aerosol was discharged for a time of 1-2 seconds for each discharge. Three times there was no flame propagation; twice there was only a slight flame propagation below the 18 inch limit, but without any backfiring phenomena, wherefore the formulation turned out to be non-inflammable according to the B.O.E. test standards.

The formulation showed excellent deodorant properties for tobacco smell impregnated, kitchen smell impregnated, organic sulphur smell impregnated rooms, and against other smells caused by nitrogenous compounds.

Just for comparative purposes, the B.O.E. test was then carried out with an analogous composition in which the propelling agent consisted of isobutane only. For this purpose, into the aerosol container of tin-plated iron sheet, having a holding capacity of 236 ml (6 oz.), were introduced 31.4 g of ethanol and 15.7 g of isopropanol.

After clinching on the spray valve, into the spray bomb were injected 53.9 g of isobutane.

Thereupon, to the valve was attached the actuator and the container was bled of its trapped air, following the above procedure.

On carrying out the B.O.E. test, the composition proved to be extremely inflammable.

EXAMPLE 2

Into an aerosol container made of tin-plated iron sheet of 236 ml holding capacity there were introduced 50 g of solution A, described in Example 1. After fitting on a valve with a dip tube onto the container, into the container were injected 50 ml of a mixture made up of 25 parts by weight of propane, 25 parts of isobutane and 50 parts by weight of $CBrF_3$.

Thereupon, the valve was fitted with the actuator and the container was freed of trapped air.

The flame propagation B.O.E. test was carried out seven times, each having a discharge time of 1-2 seconds per discharge. Four times there was no flame propagation; for three times there was only a modest flame propagation, below the 18 inch limit. Therefore, the formulation may be considered non-inflammable.

An analogous composition in which there were used only the hydrocarbon propellants, proved extremely inflammable.

EXAMPLES 3 and 4

Tests 3 and 4 refer to formulations suited for penetrating oil.

Into a 135 ml holding capacity, Pyrex glass aerosol container were introduced, in the first test, 16 g of methylene chloride, 5 g of kerosene and 12,5 g of isoalkanes with 10-14 carbon atoms, having a boiling temperature of 175°-200° C. (solution C).

The dispensing valve (spray valve) was then fitted onto the aerosol container and into the same was then injected 50 ml of a mixture of 50 parts (by weight) of isobutane and 50 parts b.w. of $CBrF_3$.

The end mixture proved perfectly homogeneous both at room temperature as well as at 0° C.

To the dispensing valve was then fitted the actuator and the container was bled of its trapped air.

Thereupon was carried out the B.O.E. test and there was observed the absence of flame propagation.

During another test, into the aerosol container filled with the same quantity of solution C, there was injected 77 ml of a mixture consisting of 45 parts b.w. of isobutane, and 55 parts of $CBrF_3$, obtaining the same results.

Just for comparative purposes, a B.O.E. test was then carried out with an analogous composition of the first test, using as propellant only isobutane. The composition turned out to be extremely inflammable under the B.O.E. test.

EXAMPLE 5

This test was carried out with a formulation suited as an alcohol-based hair lacquer.

Into an aerosol container of Pyrex glass and having a holding capacity of 135 ml, there were introduced: 30 g of a homogeneous solution consisting of 5 parts b.w. of polyvinylpyrrolidone, 0.75 parts b.w. of myristic alcohol, 0.75 parts b.w. of perfume and 93.5 parts b.w. of absolute ethanol (solution B).

After fitting onto the container a dispensing valve (spray valve), into the container were injected 60 ml of a propellant composition consisting of 30 parts b.w. of isobutane, 40 parts b.w. of $CH_3$—$CClF_2$ and 30 parts b.w. of $CBrF_3$. The mixture appeared perfectly homogeneous. On carrying out the B.O.E. test, the formulation proved non-inflammable.

EXAMPLES 6–10

Tests from 6 to 10 refer to other formulations suited as hair lacquers.

A homogeneous solution (solution D) is prepared, consisting of 5.5 parts (by weight) of 28/1310 resin produced by Eigemann & Veronelli of Milan 0.6 parts b.w. of 2-amino-2-methylpropanol, 0.5 parts b.w. of benzyl alcohol, 0.50 part by weight of perfume, 46.45 parts by weight of anhydrous ethanol and 46.45 parts b.w. of methylene chloride.

In test 6, into a Pyrex glass container of 135 ml holding capacity, and following the procedures of Example 1, there were introduced 30 g of solution D and 60 ml of a propellant composition consisting of 30 parts (by weight) of isobutane, 40 parts b.w. of $CH_3$—$CClF_2$ and 30 parts b.w. of $CBrF_3$. The mixture appeared homogeneous, even at 0° C.

At the B.O.E. test the formulation proved to be inflammable.

In test 7, into the container was introduced 30 g of solution D and 67 ml of a propellant mixture consisting of 37 parts by weight of isobutane, 55 parts b.w. of $CF_3$—$CH_2Cl$ and 8 parts b.w. of $CBrF_3$.

The mixture appeared homogeneous, even at 0° C., and proved non-inflammable. The pressure of the formulation amounted to 3.4 absolute atmospheres at 23° C.

In test 8, into the reaction container there were introduced 30 g of solution D and 67 ml of a propellant mixture consisting of 63 parts b.w. of $CH_3$—$CHF_2$, 27 parts b.w. of n-butane and 10 parts b.w. of $CBRF_3$.

The mixture appeared homogeneous even at 0° C. and proved non-inflammable.

In test 9, into a container of 85 ml holding capacity there were introduced 15 g of solution D and 32 ml of a propellant mixture consisting of 30 parts b.w. of $CH_2ClF$, 40 parts b.w. of n-butane and 30 parts b.w. of $CBrF_3$. The mixture appeared homogeneous even at 0° C. and proved uninflammable.

In test 10, into a container of 135 ml holding capacity were loaded 30 g of solution D and 67 ml of a propellant mixture consisting of 50 parts b.w. of isobutane and 50 parts b.w. of $CBrF_3$. The mixture proved to be uninflammable.

EXAMPLES 11–16

Tests 11–16 refer to air deodorants.

There was prepared a solution (solution E) consisting of 1 part by weight is isopropylmyristate, 1.2 parts b.w. of triethyleneglycol, 0.3 parts b.w. of perfume, 15 parts by weight of pure ethanol, 7.5 parts b.w. of isopropanol and 10 parts b.w. of methylene chloride.

In test 11, into a container of tin-plated iron sheet and with a holding capacity of 236 ml, following the procedure followed in Example 1, there were loaded: 40 g of solution E and 87 ml of a propelling mixture consisting of 40 parts b.w. of isobutane, 40 parts of $CHClF_2$ and 20 parts b.w. of $CBrF_3$. The mixture thus formed appeared homogeneous and proved uninflammable.

In test 12, into a Pyrex glass container of 135 ml holding capacity were loaded: 30 g of solution E and 60 ml of a mixture consisting of n-butane (58 parts b.w.), $CH_3$—$CF_3$ (21 parts b.w.) and $CBrF_3$ (21 parts b.w.). The mixture thus formed appeared perfectly homogeneous, even at 0° C., and proved uninflammable.

In test 13, into a Pyrex glass container of 135 ml holding capacity were loaded: 30 g of solution E and 67 ml of a mixture of isobutane (45% b.w.) and $CBrF_3$ (55% b.w.). The mixture thus formed appeared perfectly homogeneous, even at 0° C., and proved uninflammable.

In test 14, into a Pyrex glass container of 135 ml holding capacity were loaded: 30 g of solution E and 67 ml of a mixture of isobutane (27 parts b.w.) and $CBrClF_2$ (73 parts b.w.). The mixture thus formed appeared perfectly homogeneous, even at 0° C., and proved uninflammable.

In test 15, into a tin-plated iron sheet container of 236 ml holding capacity there were introduced: 50 g of solution E and 93 ml of a mixture consisting of 25 parts b.w. of n-butane, 25 parts b.w. of isobutane and 50 parts b.w. of $CBrF_3$. The mixture thus formed appeared perfectly homogeneous, even at 0° C. and proved uninflammable.

In test 16, into a Pyrex glass container of 135 ml holding capacity there were introduced: 30 g of solution E and 69 ml of a mixture consisting of: 45 parts b.w. of propane, and 55 parts b.w. of $CBrClF_2$. The mixture thus formed appeared homogeneous, even at 0° C. and proved uninflammable.

EXAMPLE 17

This test refers to a hair lacquer.

The concentrate (solution F) consists of: 5 parts by weight of polyvinylpyrrolidone, 0.75 parts b.w. of isopropylmyristate, 0.75 parts b.w. of perfume, 46.75 parts b.w. of methylene chloride and 46.75 parts b.w. of absolute ethyl alcohol.

Following the procedure described in Example 1, into an aluminum container of 85 ml holding capacity there were loaded 20 g of solution F and 30 ml of a propelling mixture consisting of 40 parts by weight of isobutane and 60 parts b.w. of $CBrF_3$. The mixture proved uninflammable.

What is claimed is:

1. Propellant compositions consisting of a mixture of
   (a) from 20 to 40% by weight of one or more propelling hydrocarbon substances selected from the group consisting of propane, n-butane, isobutane, pentane and isopentane;
   (b) from 10 to 25% by weight of a halogenated organic compound consisting of $CBrF_3$; and
   (c) from 40 to 70% by weight of a fluorinated or chlorofluorinated propelling substance selected from the group consisting of $CH_3$—$CHF_2$, $CF_3$—$CH_2Cl$ and $CH_3$—$CClF_2$.

* * * * *